United States Patent
Tanaka (12) 
(10) Patent No.: US 6,288,775 B1
(45) Date of Patent: Sep. 11, 2001

(54) LIGHTWAVE DISTANCE MEASURING APPARATUS AND METHOD

(75) Inventor: Tomohiro Tanaka, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/310,587

(22) Filed: May 12, 1999

(30) Foreign Application Priority Data

May 15, 1998 (JP) .................................................. 10-132915

(51) Int. Cl.[7] .............................. G01C 3/08; G01S 13/08; G01S 15/00
(52) U.S. Cl. ........................ 356/5.07; 342/135; 356/5.08; 367/97
(58) Field of Search .................................. 356/5.01–5.08; 342/40, 134, 135, 136; 367/95, 97

(56) References Cited

U.S. PATENT DOCUMENTS

| | | |
|---|---|---|
| 3,409,368 | * 11/1968 | Fernandez . |
| 3,503,680 | * 3/1970 | Schenkerman . |
| 3,645,624 | * 2/1972 | Schenkerman . |
| 3,728,026 | * 4/1973 | Idestrom et al. . |
| 3,941,483 | * 3/1976 | Ferrin . |
| 3,983,557 | * 9/1976 | Powell et al. . |
| 4,040,054 | * 8/1977 | Overman . |
| 4,113,381 | 9/1978 | Epstein ....................................... 356/5 |
| 4,699,508 | * 10/1987 | Bolkow et al. . |
| 5,241,360 | * 8/1993 | Key et al. . |
| 5,550,546 | * 8/1996 | Noneman et al. ...................... 342/13 |

FOREIGN PATENT DOCUMENTS

| | | |
|---|---|---|
| 59-24397 | 6/1984 | (JP) . |
| 3-21502 | 5/1991 | (JP) . |

* cited by examiner

Primary Examiner—Stephen C. Buczinski
(74) Attorney, Agent, or Firm—Foley & Lardner (57) ABSTRACT

A lightwave distance measuring apparatus having a coaxial light-transmitting/receiving type optical system is provided with light-transmitting means for transmitting pulsed light toward an object, light-receiving means for receiving reflected pulsed light reflected by the object, a time measuring section for measuring a period of time from when the pulsed light is transmitted until the light is received, a distance measuring section for determining a distance to the object from the measured period of time, and a pulse number detecting section for detecting whether the number of received pulses of reflected light in response to one transmitting pulsed light is one or more; while the value measured when only one pulse of the reflected light is detected by the pulse number detecting section in response to the transmission of pulsed light is made effective.

5 Claims, 5 Drawing Sheets

LIGHTWAVE DISTANCE MEASURING APPARATUS AND METHOD

BACKGROUND OF THE INVENTION

1. Field of the Invention

The present invention relates to a lightwave distance measuring apparatus which measures the distance to an object to be measured by using pulsed light; and, in particular, to a lightwave distance measuring apparatus which prevents erroneous measurement from occurring due to stray light or the like generated along with transmission of pulsed light.

2. Related Background Art

As the configuration of distance measuring apparatus using lightwaves, biaxial type and coaxial type have conventionally been known from the viewpoint of relative arrangement between the light-transmitting optical path and light-receiving optical path. Of these types, the coaxial type optical system has an advantage in its capabilities of making the apparatus smaller, avoiding parallax, and installing a collimation optical system for targeting the light-transmitting optical path at the object to be measured. Namely, it is a coaxial light-transmitting/receiving type optical system in which the light-transmitting axis of the lightwave used for distance measurement and the light-receiving axis for receiving the reflected light from the object to be measured coincide with each other.

On the other hand, the distance measuring system of the distance measuring apparatus using lightwaves is broadly divided into a continuously modulated wave type in which an LED or semiconductor laser is used as its light source; and a pulse type in which a semiconductor laser, adapted to be pulse-driven, outputting pulsed light with a large peak power is used as its light source. For these distance measuring apparatus, there has conventionally been a demand for enhancing their maximum distance measuring range, and there has been an increasing demand for their measuring capacity in a non-prism configuration which does not employ a reflector such as cube corner prism at the measuring point in order to save the labor and improve the efficiency of operations. For responding to these demands, the pulse type, which can use a large peak power, is definitely advantageous.

SUMMARY OF THE INVENTION

When a coaxial optical system is employed for projecting pulsed light having a large peak power into a light-transmitting optical path, there is a possibility of the light reflected from the inner side face of an objective lens, inner face of a lens barrel, or the like, i.e., so-called stray light, being received by the light-receiving optical path, which may cause a large error in measured values.

Therefore, it is an object of the present invention to provide a lightwave distance measuring apparatus which can determine, in a coaxial light-transmitting/receiving type optical system, whether stray light is made incident thereon or not.

In order to achieve the above-mentioned object, the lightwave distance measuring apparatus in accordance with the present invention is a lightwave distance measuring apparatus having a coaxial light-transmitting/receiving type optical system; the apparatus further comprising light-transmitting means for transmitting pulsed light toward an object, light-receiving means for receiving reflected pulsed light reflected by the object, a time measuring section for measuring a period of time from when the pulsed light is transmitted until the light is received, a distance measuring section for determining a distance to the object from the measured period of time, and a pulse number detecting section for detecting whether the number of pulses of light received by the light-receiving means in response to one transmitting pulsed light is one or more.

When so-called stray light is generated, the receiving means detects the reflected pulsed light caused by the stray light, in addition to the reflected pulsed light from the aimed object, whereby a plurality of pulses of reflected light are measured in response to one pulse of transmitted light. As a consequence, counting the number of pulses of reflected light can detect the occurrence of stray light.

Preferably, when a plurality of pulses of received light are counted by the pulse number detecting section, the distance measuring section is kept from carrying out distance measurement based on the received pulsed light. As a consequence, the values measured when stray light occurs are eliminated. When a plurality of measurement operations are carried out and their mean measured value is outputted, the values measured with stray light occurring can be eliminated, so that the values measured without stray light being generated can be used as a basis, whereby more correct distance measurement can be performed.

Preferably, the lightwave distance measuring apparatus of the present invention further comprises signal selecting means which outputs, when the light-receiving means yields an output signal strength at a predetermined value A or higher, a time measurement termination signal for detecting the time when the light is received, whereas the pulse number detecting section counts the number of pulses of received light by which the output signal strength of the light-receiving means becomes a predetermined value B or higher, the predetermined value B being set slightly lower than the predetermined value A.

As a consequence, when a plurality of time measurement termination signals are outputted to the time measuring section due to stray light, the pulse number detecting section reliably carries out counting so as to indicate that a plurality of pulses of light are received, whereby errors in measurement can more securely be prevented from occurring due to stray light or the like.

On the other hand, the lightwave distance measuring method in accordance with the present invention comprises: a preliminary light-transmitting step of transmitting pulsed light toward an object; a preliminary light-receiving step of receiving by a light-receiving apparatus the pulsed light reflected by the object; a step of detecting a reflected light quantity level of the received pulsed light and adjusting, in response thereto, an amount of transmission through a filter for regulating the quantity of pulsed light incident on the light-receiving apparatus; and a main measurement step, after termination of the adjustment, of repeatedly transmitting pulsed light toward the object and receiving the reflected light therefrom at a predetermined interval, measuring a period of time from when each pulse of light is transmitted until the reflected light corresponding thereto is received, determining a distance to the object from the measured period of time, counting the number of pulses received in response to each pulse of the transmitted light, making thus measured value effective only when the number of pulses of received light is one, and outputting a mean value of effective measured values as a measured result when at least a predetermined number of effective measured values are obtained.

As a consequence, reliable distance measurement can be carried out by use of lightwaves while eliminating influences of stray light.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4A is a detailed circuit diagram of the pulse number detecting means in this embodiment, whereas

DETAILED DESCRIPTION OF THE PREFERRED EMBODIMENTS

In the following, embodiments of the present invention will be explained with reference to the accompanying drawings. To facilitate the comprehension of the explanation, the same reference numerals denote the same parts, where possible, throughout the drawings, and a repeated explanation will be omitted. These embodiments, however, are not meant to restrict the technical scope of the present invention.

Figure 1:
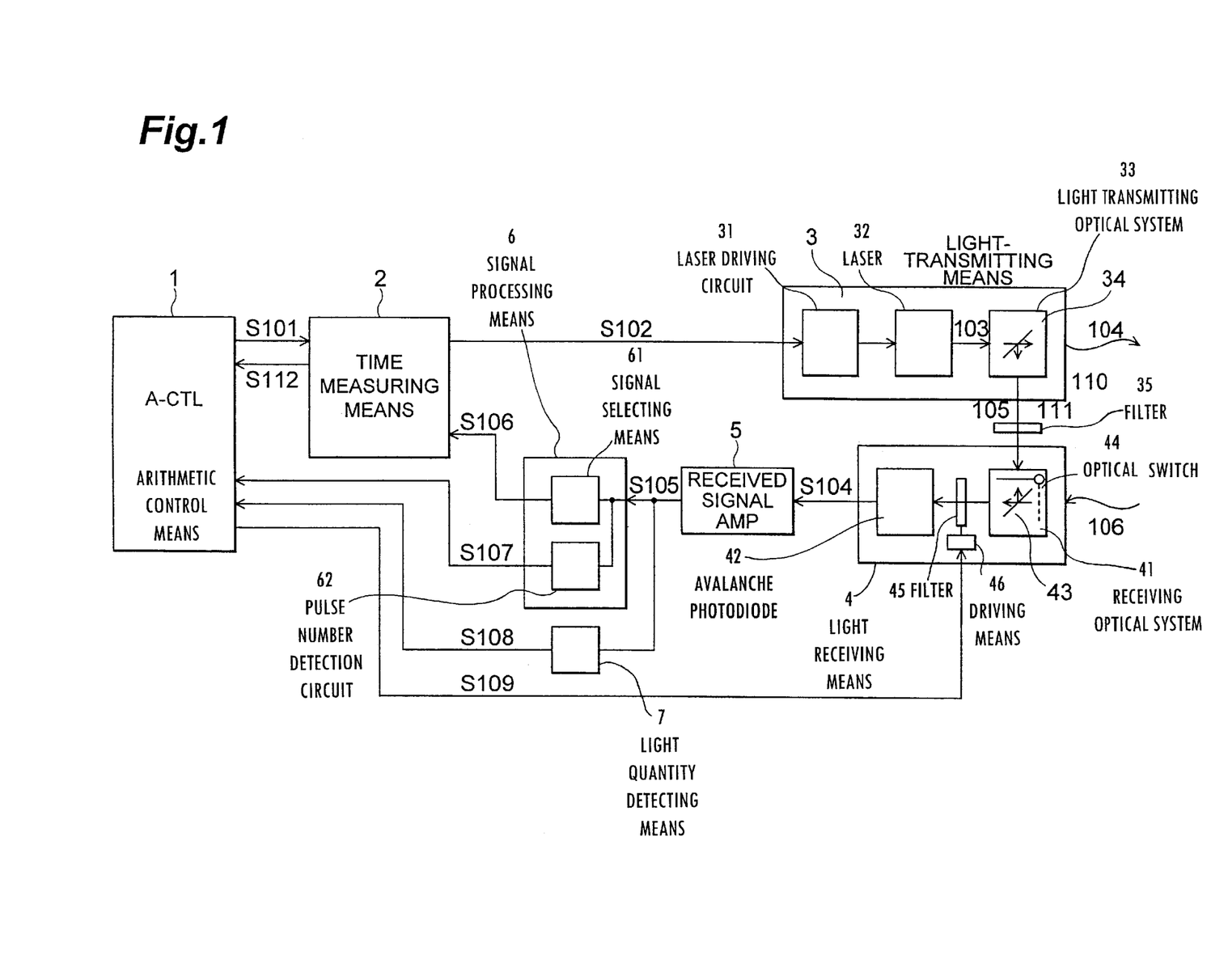
FIG. 1 is a circuit block diagram of an embodiment of the lightwave distance measuring apparatus in accordance with the present invention.

FIG. 1 is a circuit block diagram of an embodiment of the lightwave distance measuring apparatus in accordance with the present invention.

An arithmetic control means 1 constituted by a CPU or the like supplies a distance measurement command signal S101 to a time measuring means 2 according to a distance measurement command from an operator or the like. The time measuring means 2 has a counter, for example, and starts time measurement by means of this counter while supplying a pulse emission command S102 to a light-transmitting means 3. The light-transmitting means 3 has a semiconductor laser driving circuit 31, a semiconductor laser 32 driven thereby, and a light-transmitting optical system 33 for transmitting emitted pulsed light 103, for example.

Provided in the light-transmitting optical system 33 is an optical path dividing means 34, which is constituted, for example, by a half mirror obliquely disposed in the entrance optical path of the pulsed light 103 at an angle of 45 degrees, for splitting the pulsed light 103 into a distance measuring optical path 110 and a reference optical path 111. As a consequence, the pulsed light 103 is projected toward an object to be measured as distance measuring pulsed light 104 and is transmitted to the reference optical path 111 as reference pulsed light 105. The reference optical path 111 is disposed within the lightwave distance measuring apparatus.

The reflected pulsed light 106, which has been projected into the distance measuring optical path 110, reflected by the object to be measured, and returned through the distance measuring optical path 110, and the reference pulsed light 105, which has traveled through the reference optical path 111, are received by an APD (avalanche photodiode) 42, which is a highly sensitive light-receiving device, by way of a light-receiving optical system 41 within a light-receiving means 4, so as to be subjected to photoelectric conversion. The light-receiving optical system 41 comprises a half mirror 43 obliquely disposed with respect to each incident optical axis, and an optical path switching means 44 for blocking one of the distance measuring optical path 110 and reference optical path 111 from which the pulsed light is made incident on the half mirror 43 and opening the other in response to a command from the arithmetic control means 1. Consequently, the received pulse signal S104 outputted from the APD 42 after the photoelectric conversion becomes a signal corresponding to the pulsed light from the optical path on the side (open side) not blocked by the optical path switching means 44, i.e., from the distance measuring optical path 110 or the reference optical path 111. Disposed between the light-receiving optical system 41 and the APD 42 is a light-regulating filter 45, which is driven by a driving means 46 driven by a command from the arithmetic control means 1, for regulating the quantity of light transmitted therethrough.

The received pulsed light signal S104 is amplified by a signal amplifying means 5, and thus amplified received pulse signal S105 is supplied to a signal processing means 6. In the signal processing means 6, a signal selecting means 61 detects the received pulse signal S105 having a peak value not lower than a predetermined threshold, and outputs a received timing signal S106 to the time measuring means 2. The time measuring means 2 terminates the time measurement at the timing when the received timing signal S106 is received, and transfers thus measured result S112 to the arithmetic control means 1. Then, the arithmetic control means 1 calculates the distance to the object to be measured according to the measured time S112, velocity of light, and the like.

Figure 2A:
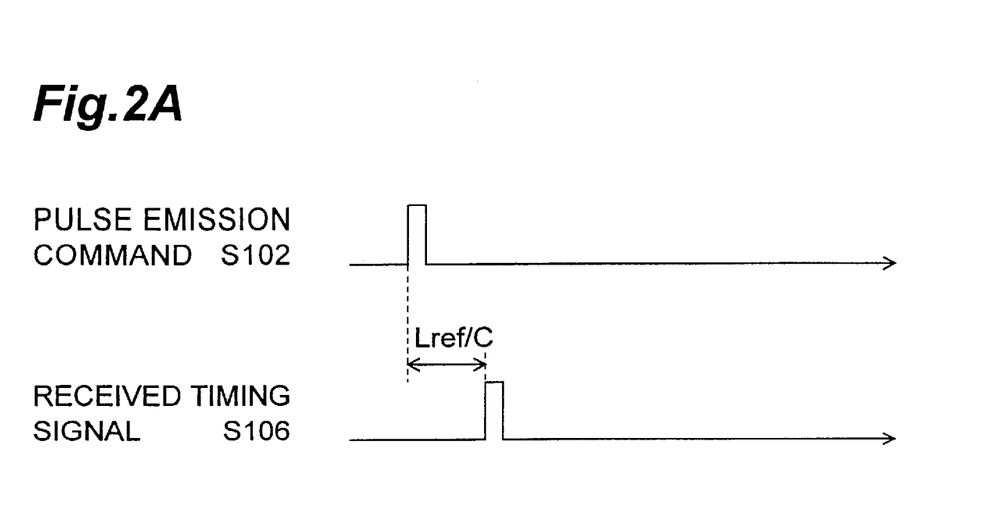
FIGS. 2A and 2B are timing charts showing light-receiving and light-transmitting timings in the reference optical path and distance measuring optical path in this embodiment, respectively.
Figure 2B:
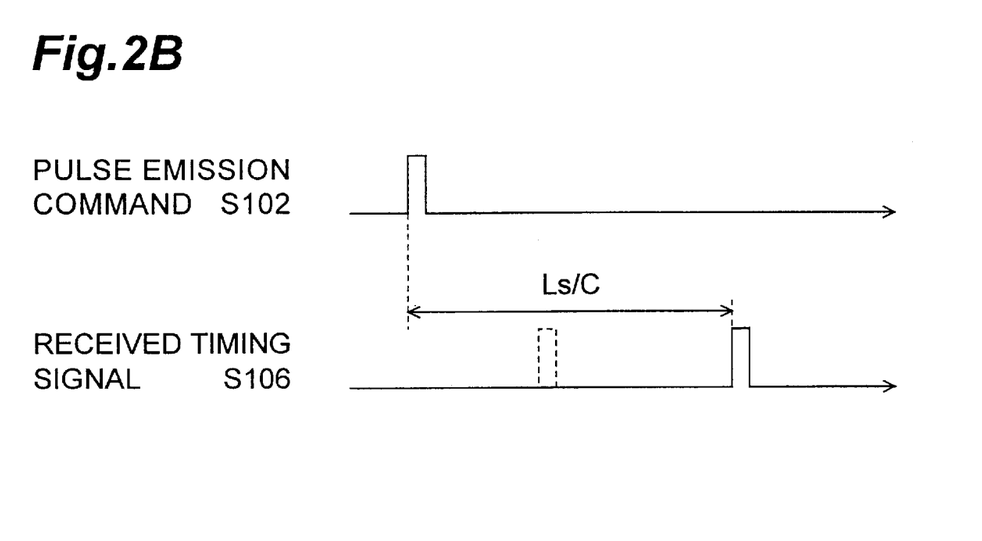

FIGS. 2A and 2B are charts for explaining a distance measuring method carried out by the apparatus of FIG. 1. FIG. 2A shows a relationship between the pulse emission command S102 and the received timing signal S106 in the case where the pulsed light is transmitted through the reference optical path 111. FIG. 2B shows a relationship between the pulse emission command S102 and the received timing signal S106 in the case where the pulsed light is transmitted through the distance measuring optical path 110.

Returning to FIG. 1, when the optical path switching means 44 blocks the distance measuring optical path 110 (opens the reference optical path 111), the reference pulsed light 105 is transmitted to the reference optical path 111 and, with its power greatly attenuated by a light-attenuating filter 35, reaches the light-receiving means 4. Then, the signal processing means 6 outputs the received timing signal S106 to the time measuring means 2 according to the received pulse signal S104. As mentioned above, the time measuring means 2 measures the time S112 from the pulse emission command S102 to the received timing signal S106, and the arithmetic control means 1 determines the measured distance Lref in the reference optical path 111 according to the measured time S112 and the velocity of light c (see FIG. 2A).

When the optical path switching means 44 blocks the reference optical path 111 (opens the distance measuring optical path 110), by contrast, the distance measuring pulsed light 104 is transmitted through the distance measuring optical path 110, is reflected by the object to be measured, and then returns through the distance measuring optical path 110 as the reflected pulsed light 106, which is detected by the light-receiving means 4. Then, as mentioned above, the received timing signal S106 based on the received pulse signal S104 is generated, and the measured distance Ls in the distance measuring optical path is determined by calculation in a manner similar to that mentioned above (see FIG. 2B).

Thereafter, the arithmetic control means 1 subtracts the measured distance Lref in the reference optical path from the measured distance Ls in the distance measuring optical path, thereby determining the distance L to the object to be measured.

In general, the delay characteristic of the electronic circuit shown in FIG. 1 varies depending on the power of the pulse signal resulting from the photoelectric conversion of the light received by the APD. Therefore, the light-attenuating filter 35 and the light-regulating filter 45 carry out adjustment such that the reference pulsed light 105 and reflected pulsed light 106 received by the APD 42 have an equal power.

Namely, the amplified signal S105 is also fed into a light quantity detecting means 7, which outputs to the arithmetic control means 1 a received light quantity signal S108 indicative of the light quantity of pulsed light received by the APD 42. The arithmetic control means 1 compares the received light quantity signal at the time when the reference optical path is open with that at the time when the distance measuring optical path is open, and controls the light-regulating filter 45 so as to make them equal to each other.

More specifically, the reference pulsed light 105 is attenuated by the half mirror 34 and the light-attenuating filter 35 such that its light quantity becomes about $10^{-6}$ times the maximum light quantity of the reflected pulsed light 106.

The arithmetic control means 1 causes the optical path switching means 44 to open the reference optical path 111, and outputs a driving signal S109 to the driving means 46, so as to maximize the transmittance of the light quantity adjusting filter 45. Then, the arithmetic control means 1 stores the received light quantity signal S108 at this time. Subsequently, the arithmetic control means 1 causes the optical path switching means 44 to open the distance measuring optical path 110, compares thus obtained received light quantity signal S108 and the stored received light quantity signal S108, and drives the driving means 46 with the driving signal S109 so as make the light quantity adjusting filter 45 attain such a transmittance that the obtained received light quantity signal S108 equals the stored received light quantity signal S108.

Here, in the case where the received light quantity caused by the reflected pulsed light 106 is not greater than about $10^{-6}$ times the maximum light quantity of the reflected pulsed light, the arithmetic control means 1 does not attenuate the reflected pulsed light 106 but adjusts the light quantity adjusting filter 45 so as to attenuate the reference pulsed light 105. As a result, the maximum measuring distance can be expanded. In this case, the amplification factor of the signal amplifying means 5 is changed such that the magnitude of the amplified signal S105 from the signal amplifying means 5 with respect to the reference pulsed light 105 becomes identical to the amplified signal S105 with respect to the unattenuated reference pulsed light.

In the case where a high measurement accuracy is required, however, the above-mentioned processing is not carried out at the sacrifice of the maximum measuring distance. It is due to the fact that, though it is desirable for the transmitted pulsed light to have a narrow pulse width in order to obtain a high measurement accuracy and, as a consequence, a wide corresponding bandwidth is required for the signal amplifying means 5 to amplify a pulse signal having a narrow pulse width, the amplification factor of the signal amplifying means 5 is hard to change with a sufficient bandwidth at present.

Hence, even when the light quantity of the reflected pulsed light 106 changes according to the distance to the object to be measured or the reflectance of the object to be measured, the reflected pulsed light 106 is received by the APD 42 with its light quantity being made substantially identical to the light quantity of the pulsed light from the reference optical path.

Further, the delay characteristic of the electronic circuit varies depending on temperature. In general, it is presumed to be because of the fact that circuit devices become more active as temperature rises. This temperature-dependent delay error, however, can be canceled when the measured distance Lref in the reference optical path is subtracted from the measured distance Ls in the distance measuring optical path.

Figure 3:
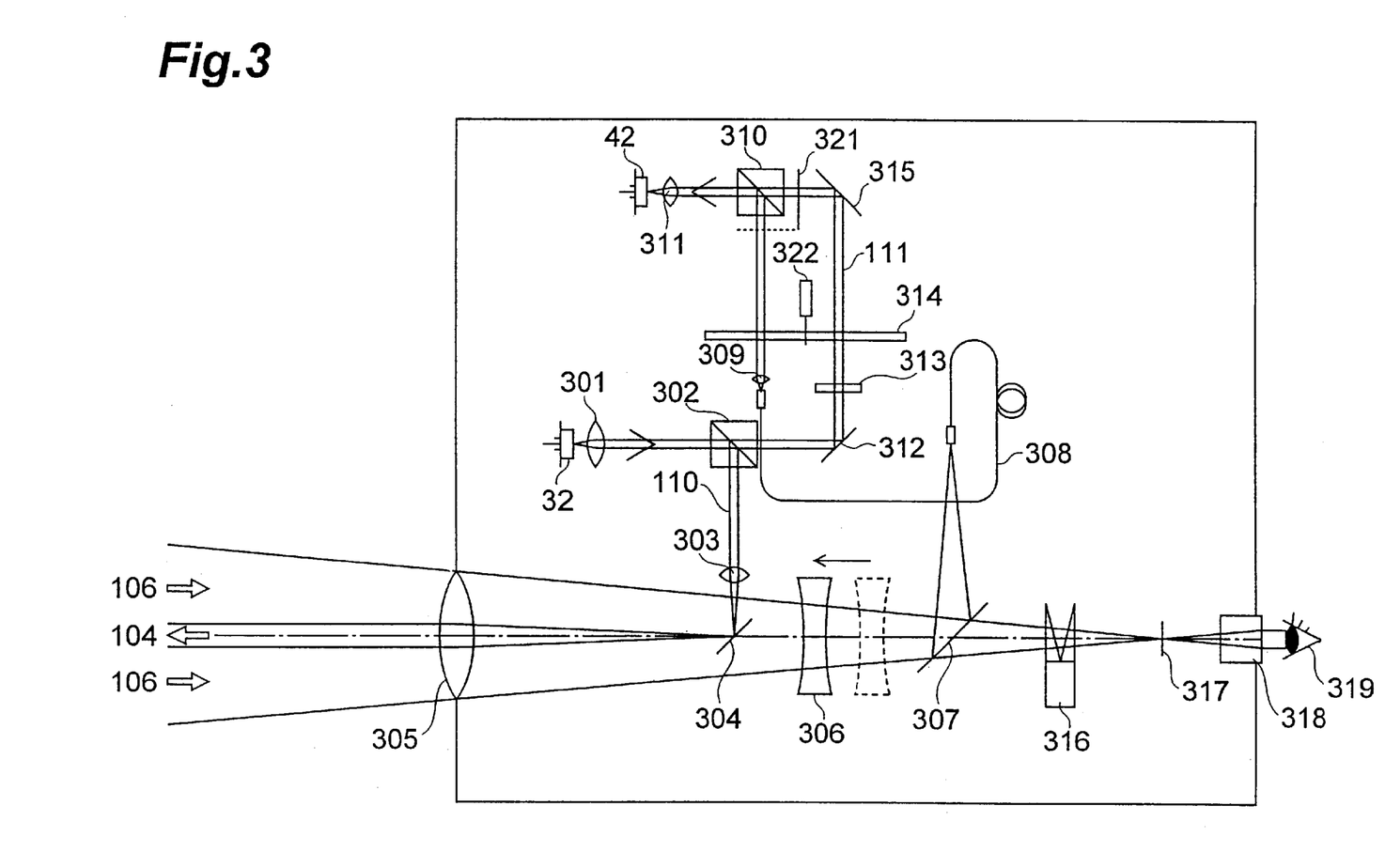
FIG. 3 is a view showing the configuration of the optical system in this embodiment.

FIG. 3 is a view showing a detailed configuration of the distance measuring optical path 110, reference optical path 111, light-transmitting means 3, and light-receiving means 4 of the embodiment shown in FIG. 1.

The pulsed light emitted from the semiconductor laser 32 is turned into a parallel luminous flux by a collimator lens 301 and is made incident on a semitransparent prism 302 (corresponding to the optical path dividing means 34 in FIG. 1). The semitransparent prism 302 has, for example, such a characteristic that the ratio between transmission T and reflection R is T:R=1:99, whereby the pulsed light transmitted toward the reference optical path 111 is greatly attenuated.

Then, the pulsed light is reflected by a mirror 312 and is transmitted through a light-attenuating filter 313 (corresponding to the light-attenuating filter 35 in FIG. 1). Further, the light is transmitted through a light quantity adjusting filter 314 (corresponding to the light quantity adjusting filter 45 in FIG. 1) which is set to the maximum transmittance, and is reflected by a mirror 315. When the reference optical path 111 is being measured, an optical path switching shutter 321 (corresponding to the optical path switching means 44 in FIG. 1) opens the optical path on the mirror 315 side, whereby the pulsed light from the reference optical path 111 is transmitted through a semitransparent prism 310 (corresponding to the half mirror 43 in FIG. 1) and a collimator lens 311, so as to be received by the light-receiving device 42.

On the other hand, the pulsed light reflected by the semitransparent prism 302 toward the distance measuring optical path 110 is transmitted through a collimator lens 303, and is reflected by a dichroic mirror 304 so as to be transmitted through an objective lens 305 toward the object to be measured as the distance measuring pulsed light 104. Hence, the dichroic mirror 304 and the objective lens 305 constitute the light-transmitting optical system 33 of FIG. 1.

The returning reflected pulsed light 106 reflected by the object to be measured is received by the objective lens 305, and is made incident on an optical fiber 308 by way of a focusing lens 306 and a dichroic mirror 307. Each of the above-mentioned dichroic mirrors 304 and 307 has such a characteristic that infrared light is reflected thereby, whereas visible light is transmitted therethrough.

The reflected pulsed light entering the optical fiber 308 is turned into parallel light by a collimator lens 309 disposed at the other end portion of the optical fiber 308 and then, after being attenuated by the light quantity adjusting filter 314 to a light quantity equal to that of the reference pulsed light 105 from the reference optical path, is reflected by the semitransparent prism 310 so as to be received by the light-receiving device 42. When the distance measuring optical path side is selected, the reference optical path side is closed by the optical path switching shutter 321, so that the optical fiber 308 side is released. As explained in the foregoing, the objective lens 305, the focusing lens 306, and the dichroic mirror 307 constitute the light-receiving optical system 41 of FIG. 1.

Here, when the light quantity of the reflected pulsed light 106 is smaller than that of the reference pulsed light 105, then the light quantity adjusting filter 314 attenuates the reference pulsed light without attenuating the reflected pulsed light 106. Namely, in order to increase the maximum measuring distance as much as possible, the light quantity adjusting filter 314 attenuates the light quantity of the reflected pulsed light only when the light quantity of the reflected pulsed light is greater than that of the reference pulsed light, and attenuates the reference pulsed light without attenuating the reflected pulsed light when the light quantity of the reflected pulsed light is small, thereby making their light quantities equal to each other.

The light quantity adjusting filter 314 is a diskshaped filter whose transmittance varies along the circumferential direction thereof at positions where the reference pulsed light and distance measuring pulsed light are transmitted therethrough. This filter 314 is rotated by a driving motor 322 (corresponding to the driving means 46 in FIG. 1) at the center thereof. The transmittance of the filter at the position where the reference pulsed light is transmitted therethrough is fixed at the maximum transmittance in the area where the reflected pulsed light having a light quantity greater than that of the reference pulsed light is obtained, whereas it varies along the circumferential direction only in the area where the reflected pulsed light having a light quantity greater than that of the reference pulsed light is not obtained.

FIG. 3 also shows a collimation optical system for making the optical axis of the light-transmitting/receiving optical system coincide with the direction of the object to be measured. Namely, with respect to an operator 319, an eyepiece 318, a reticle 317, an erect prism 316, the focusing lens 306, and the objective lens 305 constitute the collimation optical system. Each of the dichroic mirrors 304 and 307 has such a characteristic that visible light is transmitted therethrough. Thus, in the embodiment shown in FIG. 3, the collimation optical system is constructed on the same optical axis as the light-transmitting optical system and the light-receiving optical system.

As a consequence, while the distance to the object to be measured can reliably be measured, the distance measuring apparatus can be made smaller.

When the above-mentioned high-power pulsed light is transmitted to the light-transmitting optical system, it is reflected, for example, by the inner face side of the objective lens 305 of the light-transmitting optical system, so as to be made incident on the optical fiber 308 by way of the dichroic mirror 307. Such light is known as stray light and causes errors in measurement of the distance measuring optical path.

Namely, in the conventional apparatus, as shown in FIG. 2B, the measurement of the distance measuring optical path is effected by the calculation based on velocity of light and the period of time from the pulse emission command S102 to the initial signal of the received timing signals S106 indicative of the fact that the received pulse signal S105 having a predetermined value or higher is received by the signal selecting means 61. Consequently, when stray light is made incident on the light-receiving device as relatively strong pulsed light as indicated by broken line in FIG. 2B, the pulsed light caused by the stray light may be mistaken for the regular reflected pulsed light, so that an erroneous received timing signal may be generated, by which an erroneous measured distance may be obtained in the distance measuring optical path. In this case, the signal caused by the regular pulsed light detected subsequent to the pulsed light caused by the stray light will be neglected.

Also, the pulsed light caused by stray light does not always become a pulse signal which can be detected by the signal selecting means 61. Namely, as mentioned above, the light quantity in the distance measuring optical path 110 is adjusted by the light quantity adjusting filter 314 such that the reflected pulsed light and the reference pulsed light have an equal level of light quantity without reducing the light quantity of weak reflected pulse light. As a consequence, when the light quantity of the reflected pulsed light is small, the pulsed light caused by stray light is received by the light-receiving device 42 without being attenuated. Also, when the light quantity of the reflected pulsed light is large, it is greatly attenuated by the light quantity adjusting filter 314, whereby the pulsed light caused by the stray light may greatly be attenuated in a similar manner and fail to be detected.

Not only the stray light caused by the light-transmitting optical system, but also the reflected pulsed light other than the regular pulsed light similar to the stray light may be detected as multiply reflected light. For example, when a cube corner prism is used as the object to be measured, a part of the reflected pulsed light reflected by the cube corner prism may be reflected by the objective lens 305 of the light-receiving optical system, so as to be projected toward the cube corner prism again and detected as the second reflected pulsed light. Such multiply reflected light is likely to occur when the collimation is targeted at a part of the cube corner prism other than the center thereof, whereas it is hard to occur when the collimation is targeted at the center part of the cube corner prism.

Further, when a substance such as a branch of a tree, for example, exists in the light-transmitting optical path between the object to be measured and the distance measuring apparatus or when the distance to the object to be measured is so long that the transmitted pulsed light is enlarged so as to become greater than the size of the object to be measured, while a substance exists within the enlarged transmitted pulsed light behind the object to be measured, then there occur a plurality of targets, whereby the reflected pulsed light caused by the above-mentioned body can be detected together with the regular reflected pulsed light.

In the following, the reflected pulsed light other than the regular reflected pulse light is collectively referred to as "stray light."

Even in the case where the reference optical path is not utilized, as in the case of a distance measuring apparatus which does not require a relatively high accuracy, problems similar to those caused by the stray light or the like may be generated by light quantity adjustment which is carried out in order for the light quantity of the reflected pulsed light to fall within the dynamic range of the electronic circuit, for example.

A light-transmitting optical system surrounded by an opaque body except for its light-transmitting direction may be disposed on the object side of the light-receiving optical system so as to eliminate stray light itself. However, it would result in reducing the received light quantity, thereby contradicting to the aimed object of increasing the maximum measuring distance.

Therefore, in this embodiment, if stray light occurs, then the errors in measurement caused by the stray light are eliminated by the signal processing side.

In this embodiment, a preliminary emission is effected on the distance measuring optical path side prior to distance measurement, and the resulting light quantity from the distance measuring optical path is adjusted by the light quantity adjusting filter 314. Then, distance measuring pulsed light is transmitted to the distance measuring optical path, so as to measure the distance to the object to be measured. Here, the pulse number detecting means 62 determines whether the light-receiving side detects at least two pulses consisting of the pulsed light caused by stray light and the reflected pulsed light, or one pulse of the reflected pulsed light alone.

In the former case, the obtained result of measurement is discarded as an ineffective result. In the latter case, the obtained result of measurement is stored into a memory of the arithmetic control means 1 as an effective result. Then, the distance measuring operations are repeated until a predetermined number of effective measured values are obtained, and the arithmetic control means 1 calculates, displays, and outputs a mean value of the measured results stored in the memory. In the case where the ratio of ineffective measured results is so high that the time required for obtaining the predetermined number of measured results exceeds a predetermined period of time, there is a strong possibility of the collimating state, the distance measuring optical path, or its surrounding environment having problems, whereby the situation is indicated as an error, and an inspection is called for.

When the reflected pulsed light is so weak that no pulse can be detected, the measurement is disabled at the initial stage.

Figure 4A:
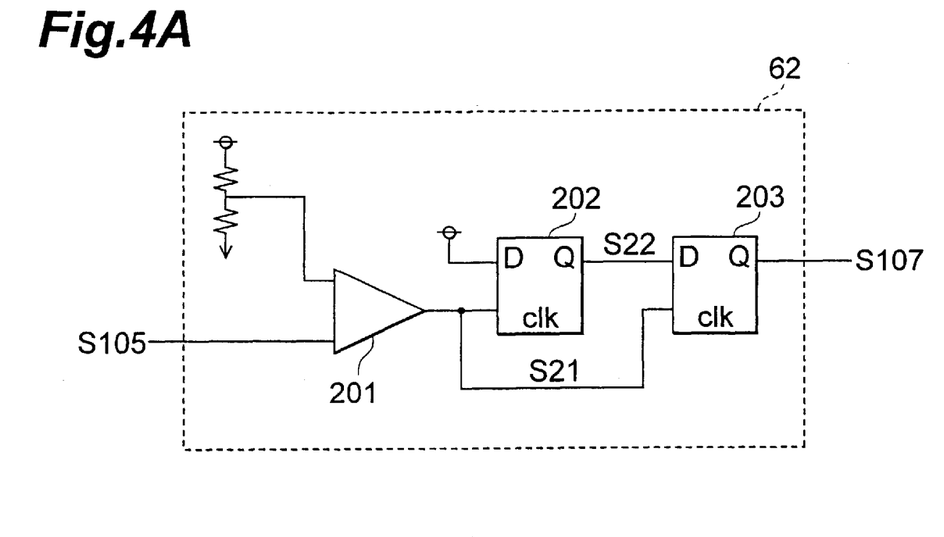
Figure 4B:
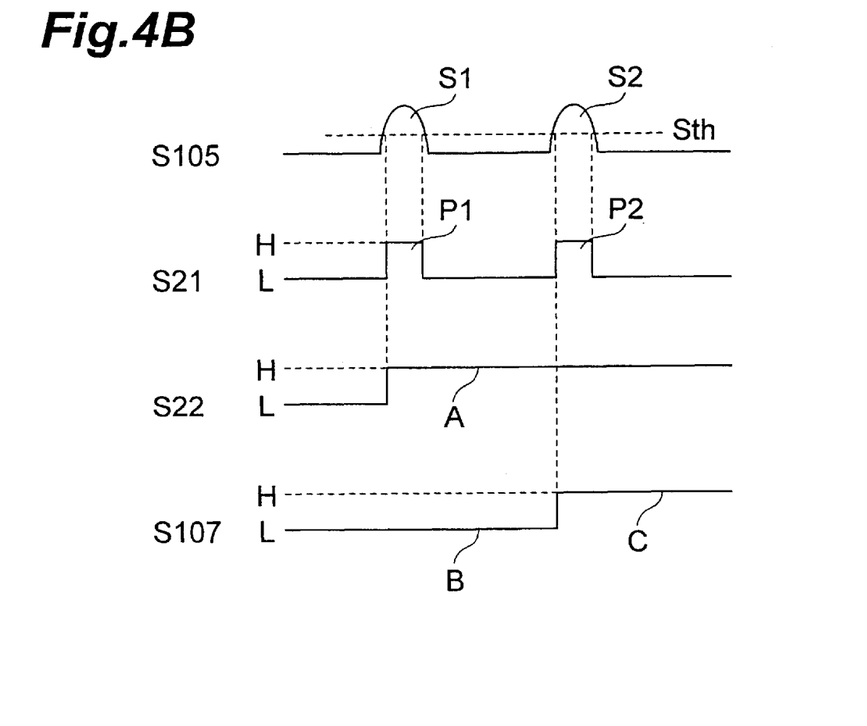
FIG. 4B is a timing chart of operations thereof.

FIG. 4A shows a circuit configuration of the pulse number detecting means 62, whereas FIG. 4B is a timing chart thereof. In the following, operations of this circuit will be explained with reference to FIGS. 4A and 4B.

The output S105 of the signal amplifying means 5 is fed into a comparator 201. A predetermined level of DC voltage is fed into the other input terminal of the comparator 201, so as to act as a threshold $S_{th}$ of the input signal S105. As mentioned above, this threshold $S_{th}$ is set slightly lower than the threshold of the signal selecting means 61. The output S22 of a D flip-flop 202 and the output S107 of a D flip-flop 203 are set to the L level by a reset signal from the arithmetic control means, which is based on a distance measurement command from the operator.

When a signal (S1, S2 in FIG. 4B) greater than the predetermined threshold $S_{th}$ is fed into the comparator 201, then a pulse signal (P1, P2 in FIG. 4B) is generated at the output S21 of the comparator 201. The output signal S21 of the comparator 201 is fed into the clk terminals of the D flip-flops 202, 203. The Q output S22 of the D flip-flop 202 is set to L at the time of resetting mentioned above.

When there is the first pulse signal input S1 in the comparator 201, then the Q output S22 of the D flip-flop 202 changes from L to H (A in FIG. 4B) due to the rising edge of the pulse signal P1. Here, the Q output S107 of the D flip-flop 203 is kept at L (part B in FIG. 4B). Namely, when there is only one pulse signal fed into the comparator 201, then S107 maintains the L level.

In the case where there is the second pulse signal input S2 into the comparator 201, on the other hand, when the pulse signal P2 is further fed to the clk terminal of the D flip-flop 202, then the Q output S107 of the D flip-flop 203 changes from L to H (part C in FIG. 4B) due to the rising edge of the pulse signal P2. Even if there is the third or later pulse signal input into the comparator 201, the Q output S107 of the D flip-flop 203 maintains the H level.

With reference to the Q output S107 of the D flip-flop 203, the arithmetic control means 1 determines that the resulting measured distance value is effective and uses it for calculating the mean value when the output signal S107 is at L, and determines that the resulting measured distance value is ineffective and eliminates it from the data used for calculating the mean value when the output signal S107 is at H.

Figure 5:
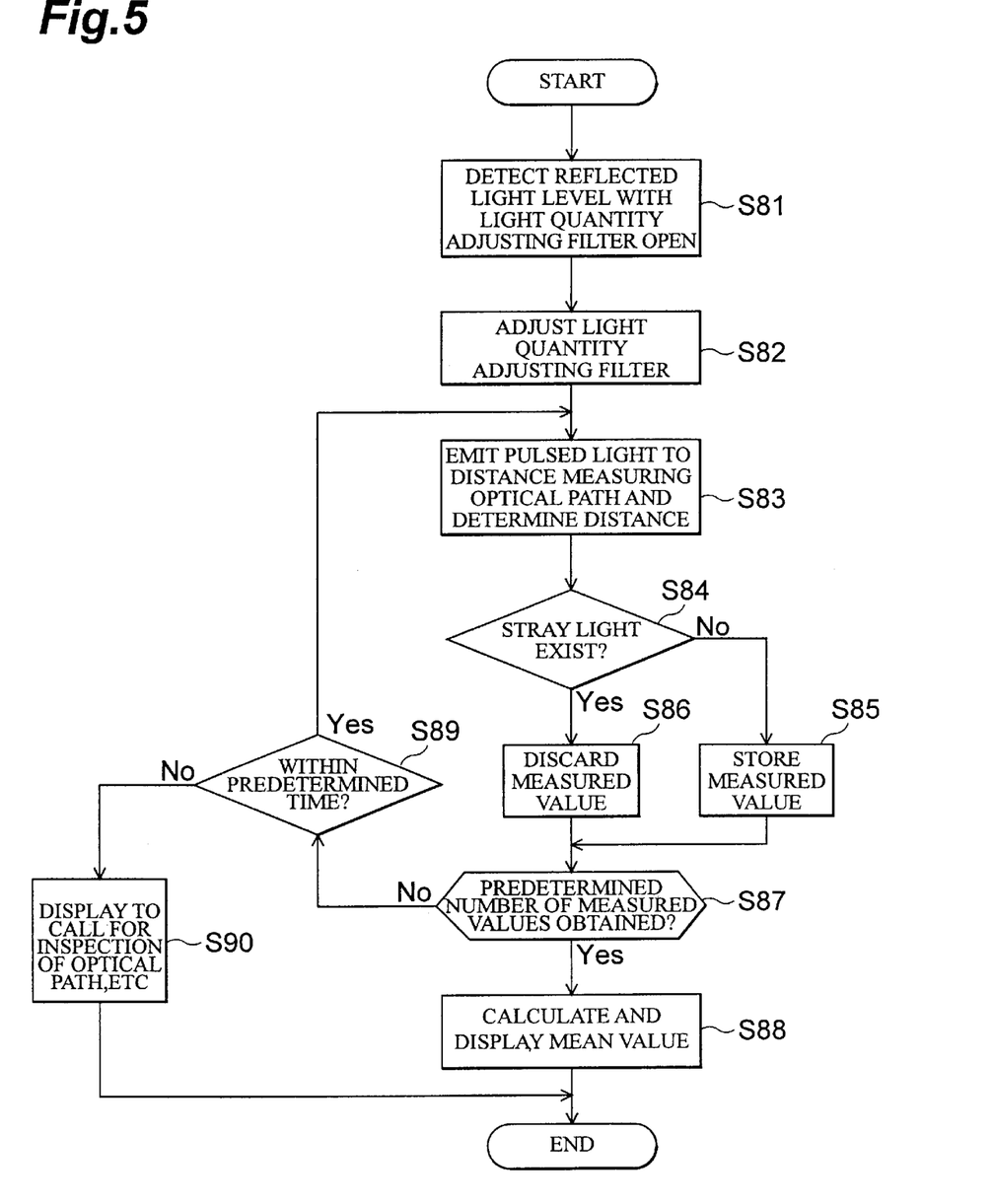
FIG. 5 is a flowchart of measurement operations in this embodiment, i.e., the lightwave distance measuring method in accordance with the present invention.

FIG. 5 is a flowchart of the measurement in accordance with an embodiment of the present invention, i.e., the lightwave distance measuring method in accordance with the present invention.

First, in this embodiment, with the light quantity adjusting filter 314 being set to its maximum transmittance state, the level of the reflected pulsed light on the distance measuring optical path side is detected (S81). Here, when the distance to the object to be measured is longer than the maximum measuring distance or when the reflectance of the object to be measured is low, the light quantity of the reflected pulsed light is so weak that it cannot be detected, whereby the situation is regarded as a measurement error. When a certain level of light quantity of reflected pulsed light is detected, according to the above-mentioned method, a driving signal from the arithmetic control means drives the driving motor 322, so as to drive the light quantity adjusting filter 314 and adjust its amount of attenuation (S82). Thereafter, while the light quantity adjusting filter 314 is in thus adjusted state, pulsed light is transmitted through the distance measuring optical path again, so as to measure the distance to the object to be measured (S83).

Then, a step of detecting pulsed light of stray light or the like is carried out for determining whether the pulse number detecting means detects one pulse of light or at least two pulses of light in response to thus transmitted pulsed light (S84). If two or more pulses of light are detected, then it is determined that there is stray light, and the flow proceeds to S86. If only one pulse of light is detected, then it is determined that there is only reflected light without stray light, and the flow proceeds to S85.

At S85, where it has been determined that there is no stray light, the measured value obtained at S83 is stored into a memory of the arithmetic control means, and then the flow proceeds to S87. At S86, where it has been determined that there is stray light, the measured value obtained at S83 is discarded, and then the flow proceeds to S87. Thereafter, it is determined whether the number of the measured values stored in the memory reaches a predetermined number or not (S87). If the predetermined number of measured values are obtained, then the mean value is calculated and is displayed as a result of measurement (S88), whereby the processing is terminated. If the predetermined number is not attained, then it is determined whether the time elapsed after starting the distance measurement at S83 is within a predetermined value or not (S89). If it is within the predetermined value, the flow returns to S83, and then the distance is measured again. If the predetermined value is exceeded at S89, there is a strong possibility of the transmittance of the light quantity being set high due to the fact that the received light quantity is small, whereby stray light may be received or an obstacle other than the object to be measured may exist within the light-transmitting optical path. Then, a display indicative of this state is effected (S90), and the processing is terminated.

The foregoing explanation relates to an example in which, when a plurality of pulses of light are received, it is determined that stray light has been made incident, and the result of measurement at this time is canceled. However, stray light has been made incident or not may be detected alone without canceling the result of measurement, and whether or not stray light has been made incident, the number of incidences thereof, or the like may be outputted.

Also, though the foregoing explanation relates to an example in which the time measuring means measures the time from the light transmission until the receiving of the initial pulse of light even in the case where a plurality of pulses of light are made incident, the time until each pulse of light is received may be measured, or a delay circuit may be provided such that time measurement is effected only when a single pulse is made incident.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lightwave distance measuring apparatus having a coaxial light-transmitting/receiving type optical system, said apparatus comprising;

light-transmitting means for transmitting pulsed light toward an object;

light-receiving means for receiving reflected pulsed light reflected by said object;

reference beam light transmitting means for transmitting a reference beam toward said light-receiving means;

light switch for directing a selected one of said reflected pulsed light and said reference beam toward said light-receiving means;

a time measuring section for measuring a first period of time from when said pulsed light is transmitted until said pulsed light is received and a second period of time from transmission by said reference beam until said reference beam is received;

a distance measuring section for determining a distance to said object from said measured first and second periods of time and without requiring timed coincidence between plural ones of the reflected pulsed light; and a pulse number detecting section for detecting whether the number of pulses of light received by said light-receiving means in response to one transmitting pulsed light is one or more, and wherein, when a plurality of pulses of received light are counted by said pulse number detecting section, said distance measuring section is kept from carrying out distance measurement based on said received pulsed light.

2. A lightwave distance measuring apparatus according to claim 1, further comprising signal selecting means which outputs, when said light-receiving means yields an output signal strength at a predetermined value A or higher, a time measurement termination signal for detecting the time when said light is received, whereas said pulse number detecting section counts the number of pulses of received light by which the output signal strength of said light-receiving means becomes a predetermined value B or higher, said predetermined value B being set slightly lower than said predetermined value A.

3. A lightwave distance measuring apparatus according to claim 1, further comprising:

a variable filter disposed between said object and said light-receiving means; and filter adjusting means to adjust the transmittance of said variable filter for regulating the quantity of pulsed light incident on said light-receiving means.

4. A lightwave distance measuring method comprising:

a preliminary light-transmitting step of transmitting pulsed light toward an object;

a preliminary light-receiving step of receiving by a light-receiving apparatus the pulsed light reflected by said object;

a step of detecting a reflected light quantity level of said received pulsed light and adjusting, in response thereto, an amount of transmission through a filter for regulating the quantity of pulsed light incident on said light-receiving apparatus; and a main measurement step, after termination of said adjustment, of repeatedly transmitting pulsed light toward said object and receiving the reflected light therefrom at a predetermined interval, measuring a period of time from when each pulse of light is transmitted until said reflected light corresponding thereto is received, determining a distance to said object from said measured period of time, counting the number of pulses received in response to each pulse of said transmitted light, making thus measured value effective only when the number of pulses of received light is one without requiring timed coincidence of received pulses, and outputting a mean value of effective measured values as a measured result when at least a predetermined number of effective measured values are obtained.

5. A lightwave distance measuring apparatus having a coaxial light-transmitting/receiving type optical system, said apparatus comprising:

light-transmitting means for transmitting pulsed light toward an object;

light-receiving means for receiving reflected pulsed light reflected by said object;

a variable filter disposed between said object and said light-receiving means;

filter adjusting means to adjust the transmittance of said variable filter for regulating the quantity of pulsed light incident on said-light receiving means;

a time measuring section for measuring a period of time from when said pulsed light is transmitted until said light is received;

a distance measuring section for determining a distance to said object from said measured period of time without requiring timed coincidence of pulsed received light;

a pulse number detecting section for detecting whether the number of pulses of light received by said light-receiving means in response to one transmitting pulsed light is one or more; and a calculating section for storing a predetermined number of effective measured distance values which are obtained only when a single pulse is received in response to one transmitting pulsed light, calculating a mean value of said effective measured distance values and outputting said mean values as a measured result.

* * * * *